UNITED STATES PATENT OFFICE.

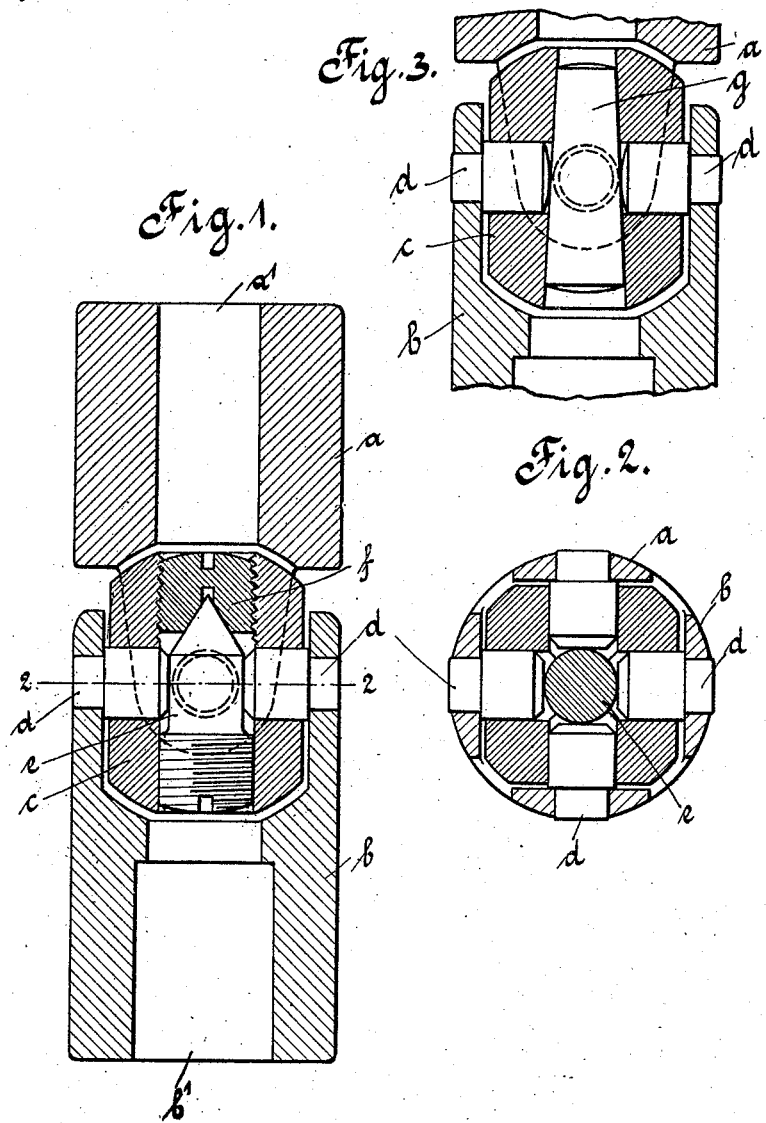

FRITZ KIEHNE, OF GROSS-LICHTERFELDE, NEAR BERLIN, GERMANY, ASSIGNOR TO TITANIA-WERK, GESELLSCHAFT MIT BESCHRÄNKTER HAFTUNG, OF BERLIN, GERMANY, A CORPORATION OF GERMANY.

UNIVERSAL JOINT.

1,307,674.  Specification of Letters Patent.  Patented June 24, 1919.

Application filed January 25 1916, Serial No. 74,200. Renewed March 10, 1919. Serial No. 281,794.

*To all whom it may concern:*

Be it known that I, FRITZ KIEHNE, engineer, a subject of the German Emperor, and residing at 69 Lorenzstr., Gross-Lichterfelde, near Berlin, State of Prussia, in the German Empire, have invented certain new and useful Improvements in or Relating to Universal Joints, of which the following is a specification.

This invention relates to universal joints of the type in which the parts to be jointed together embrace a member with which they are pivotally connected.

Universal joints of this type are well known in which the pivot pins connecting the parts with the common member are inserted into the latter from the outside. This construction has the disadvantage that the pivot pins readily become loose when the joint moves, so that the joint falls apart or is impaired. In order to obviate this defect it has been proposed to make the parts embracing the common member in several pieces and to connect the pivot pins firmly with them. This arrangement, however, resulted in the difficulty of reliably connecting the parts together, and in inconvenience in dismembering the joint.

A primary object of this invention is to provide an improved universal joint of the type described, to which the above mentioned defects are not attached. To this end, I provide that the pivot pins extend from the inside of the common member outward into the parts of the joint to be connected, and are held in the normal position by a locking member which securely prevents all the pivot pins from moving inward.

The invention consists in the construction, arrangement and combination of parts described hereinafter and pointed out in the claims.

One illustrative embodiment of the invention is represented by way of example in the accompanying drawing wherein:—

Figure 1 is a longitudinal section taken through an improved universal joint, and Fig. 2 is a cross-section taken on the line 2—2 in Fig. 1, and Fig. 3 shows a modified form of my device.

Referring to the drawing, the parts to be pivotally connected together are designated $a$ and $b$. They have known forked ends embracing the common member $c$ which has approximately the shape of a ball having flat faces, at which the prongs of the fork are located.

The pivot pins $d$ are carried in the common member $c$ and have reduced portions extending into holes in the parts $a$ and $b$. The four pivot pins are placed into their operative position in the following manner: After they have been inserted into the member $e$ the forks are placed into position embracing this member and then the pins are pushed from the inside outward, whereupon their reduced portions extend into the holes in the forks and are prevented from moving farther outward. For pushing the pins outward a screw is used which is inserted into the member $c$. This screw has a cylindrical middle portion and is pointed at its end, so that when it is screwed into the member $c$ the four pins $d$ are forced uniformly outward. In this end position of the screw the four pins bear against its cylindrical portion. For locking the screw $e$ in position a second screw $f$ is preferably screwed counter to it in the member $c$.

When dismembering the joint the screws $e$ and $f$ may be removed through the holes $a^1$ and $b^1$ in the middle of the parts $a$ and $b$; the screws are, however, accessible from the outside when the parts $a$ and $b$ are placed at an angle of about 120° one with the other.

The essence of the invention consists in the pivot pins being driven outward from the common member into the forks. Any suitable means may be used for forcing the pins outward; for example, instead of the screw a cam may be used or a member $g$ (Fig. 3) having a wedge action.

I claim:—

1. In a universal joint of the character described, the combination of a coupling member having flattened faces with a plurality of forked parts to be articularly connected and embracing said member, the forks of said parts having a hole in each prong, pivot pins extending outwardly into said holes, a means for forcing the pins outwardly and preventing them from being moved inwardly, substantially as described.

2. In a universal joint the combination of a member, a plurality of forked parts having holes in their tines to be articularly connected embracing the member, pivot pins mounted in said member all extending outward into holes in the tines of said parts and means for commonly and simultaneously moving said pins outward into said holes and locking them in their outer position.

3. In a universal joint the combination of a member, a plurality of forked parts to be articularly connected embracing the member, pivot pins mounted in said member all extending outward into holes in the tines of said parts and a screw having a cylindrical middle portion and being pointed at its end for commonly and simultaneously moving said pins outward into said holes and locking them in their outer position.

4. In a universal joint the combination of a member, a plurality of forked parts to be articularly connected embracing the member, pivot pins mounted in said member all extending outward into holes in the tines of said parts, a screw having a cylindrical middle portion and being pointed at its end for commonly and simultaneously moving said pins outward into said holes and locking them in their outer position and a second screw screwed counter to the first mentioned screw in the member for locking it.

In testimony whereof I have affixed my signature in presence of two witnesses.

FRITZ KIEHNE.

Witnesses:
HENRY HASPER,
ARTHUR SCHROEDER.

Copies of this patent may be obtained for five cents each, by addressing the "Commissioner of Patents, Washington, D. C."